United States Patent [19]
Podola et al.

[11] Patent Number: 4,910,242
[45] Date of Patent: Mar. 20, 1990

[54] STORABLE JOINT SEALING COMPOUND

[75] Inventors: Tore Podola, Monheim; Wolfgang Ernst, Duesseldorf; Winfried Emmerling, Erkrath, all of Fed. Rep. of Germany

[73] Assignee: Henkel Kommanditgesellschaft auf Aktien, Duesseldorf, Fed. Rep. of Germany

[21] Appl. No.: 230,802

[22] Filed: Aug. 10, 1988

[30] Foreign Application Priority Data

Aug. 10, 1987 [DE] Fed. Rep. of Germany ....... 3726547

[51] Int. Cl.$^4$ ......................... C08K 5/01; C08L 75/04; C08L 27/06
[52] U.S. Cl. .................................... 524/158; 524/157; 524/315; 524/356; 524/361; 524/481; 524/500; 524/502; 524/503; 524/507; 525/126; 525/129
[58] Field of Search ............... 524/481, 502, 503, 507, 524/157, 158, 315, 356, 361, 500; 525/126, 129, 58, 59

[56] References Cited

U.S. PATENT DOCUMENTS

| | | | |
|---|---|---|---|
| 4,038,239 | 7/1977 | Coyner | 528/77 |
| 4,059,549 | 11/1977 | Brinkman | 528/64 |
| 4,710,560 | 12/1987 | Vu | 528/77 |
| 4,740,424 | 4/1988 | Schumacher | 525/129 |
| 4,778,845 | 10/1988 | Tschan | 524/710 |

Primary Examiner—Lewis T. Jacobs
Assistant Examiner—David Buttner
Attorney, Agent, or Firm—Ernest G. Szoke; Wayne C. Jaeschke

[57] ABSTRACT

Moisture-hardening joint sealing compositions based on polyurethane prepolymers, swellable polymer powders, plasticizers and other auxiliaries have increased stability in storage when they contain $C_8$–$C_{20}$ olefins as stabilizers.

10 Claims, No Drawings

STORABLE JOINT SEALING COMPOUND

BACKGROUND OF THE INVENTION

1. Field of the Invention

This invention is concerned with polyurethane-based moisture-hardening joint sealing compositions and relates to such a system showing improved stability in storage.

2. Statement of Related Art

Polyurethane-based moisture-hardening sealing compositions have been known for some time. They consist essentially of an isocyanate-terminated polyurethane prepolymer and a swollen thixotropicizing polymer present therein as filler. The stability of sealing compounds such as these in storage is limited by reaction of the isocyanate groups with other constituents or with water diffusing into the composition. In addition, processability can also suffer from the fact that the degree of swelling of the polymer present changes during storage. Accordingly, to ensure safe processability of the compositions, even over prolonged periods, there is a need for products showing increased stability in storage.

Accordingly, the object of the present invention is to provide polyurethane-based moisture-hardening joint sealing compositions which show improved stability in storage.

BRIEF DESCRIPTION OF THE INVENTION

According to the present invention moisture-hardening joint sealing compositions with improved stability comprise polyurethane prepolymers, swellable polymer powders, plasticizers and other auxiliaries. The improved moisture-hardening joint sealing compositions comprise:

20 to 40% by weight polurethane prepolymers,
20 to 40% by weight swellable polymer powders,
15 to 35% by weight plasticizer (swelling agent),
1 to 10% by weight swelling aids,
1 to 10% by weight pigments and dyes,
0.01 to 2% by weight catalysts and other auxiliaries,
1 to 10% by weight stabilizers whenever the stabilizers comprise $C_8$–$C_{20}$ olefins.

DETAILED DESCRIPTION OF THE INVENTION

Moisture-hardening sealing compositions can be produced from a number of polyurethane prepolymers. Polyurethane prepolymers are normally obtained by reaction of a polyol with an excess of a polyisocyanate. Both low molecular weight and also high molecular weight compounds may be used as the polyol component. Examples of low molecular weight compounds which may be used as polyol components for polyurethane prepolymers are glycols, glycerol, butanediol and trimethylol propane. Polyether polyols or polyester polyols are generally used as the relatively high molecular weight polyol component. Polyether polyols are prepared by reaction of an epoxide or tetrahydrofuran with a low molecular weight polyol component. The epoxide used may be, for example, ethylene oxide, propylene oxide, butylene oxide, styrene oxide, cyclohexene oxide, trichlorobutylene oxide and epichlorohydrin while the polyol may be selected from such compounds as ethylene, diethylene and propylene glycol.

Polyesters as starting materials for polyurethane prepolymers are normally prepared by reaction of polyhydroxyl compounds with polycarboxylic acids. The polyhydroxyl compounds used may be, for example, ethylene glycol, diethylene glycol, triethylene glycol, 1,2-propylene glycol, dipropylene glycol, butane-1,4-diol, hexane-1,6-diol, neopentyl glycol, butane-1,3-diol, trimethylol propane, trimethylol ethane and glycerol. Suitable acid components are such compounds as adipic acid, phthalic acid, oxalic acid, malonic acid, succinic acid, glutaric acid, azelaic acid, sebacic acid and also tricarboxylic acids. Suitable polyesters for the preparation of polyurethane prepolymers may also be obtained by ring-opening polymerization of, for example, e-caprolactone or methyl-e-caprolactone. In addition to polyesters and polyethers as polyol component, however, natural substances may also be used as the polyol component, including for example castor oil.

Preferred polyols for the process according to the invention are polyether polyols, particularly those obtained by reaction of glycerol-propylene oxide adducts and polypropylene glycol.

The isocyanate component may be selected from aromatic and also aliphatic or even cycloaliphatic isocyanates. Suitable aromatic diisocyanates and triisocyanates are, for example, toluene-2,4-diisocyanate, toluene-2,6-diisocyanate, isomer mixtures of these two compounds, naphthalene-1,5-diisocyanate, benzene-1,4-diisocyanate, triphenyl methane 4,4',4'''-triisocyanate, diphenyl methane 4,4'-diisocyanate, diphenyl methane 2,4'-diisocyanate, diphenyl methane 2,2'-diisocyanate and tris-(4-isocyanatophenyl)-thiophosphate. Typical aliphatic and cycloaliphatic isocyanates are hexane-1,6-diisocyanate and 1-isocyanato-3-isocyanatomethyl-3,5,5-trimethylcyclohexane. Aromatic diisocyanates, particularly diphenyl methane 4,4'-diisocyanate, are preferably used in the process according to the invention.

In one particularly preferred embodiment of the process according to the invention, the polyurethane prepolymer is prepared by reaction of a glycerol-propylene oxide adduct, a polypropylene glycol and diphenyl methane 4,4'-diisocyanate.

In every case, the isocyanate is used in excess for the preparation of the polyurethane prepolymer, so that the polyurethane prepolymer formed contains reactive isocyanate groups.

The stability of joint sealing composition is generally established by the addition of finely divided solids. Through the creation of an internal structure, the sealant is given the necessary internal cohesion after spraying on, so that the sealant paste is prevented from running out or bulging out from vertical joints. Accordingly, the additives mentioned are often also referred to as thixotropicizing fillers or thixotropicizing agents. In joint sealing compositions based on polyurethane prepolymers, the thixotropicizing agents have to satisfy additional requirements. For example, unwanted reactions with the isocyanate groups have to be prevented. Accordingly, suitable thixotropicizing agents are essentially swellable polymer powders, examples of which are polyacrylonitrile, polyurethane, polyvinyl chloride, polyacrylates, polyvinyl alcohols, polyvinyl acetates and also the corresponding copolymers. Particularly good results are normally obtained with finely divided polyvinyl chloride powder.

However, the properties of the polyurethane joint sealing compositions may be further improved by addition of other components to the polymer powder used as thixotropicizing agent. The components in question are substances which come under the categories of plasticizers and swelling agents used for plastics. In this regard, it is always necessary to determine the optimal composition of the polyurethane prepolymer/polymer powder/plasticizer/swelling aid systems. The only requirement in this respect, apart from the factors which normally have to be taken into consideration in the choice of the components for such systems, is that neither the plasticizer nor the swelling aid should react with the isocyanate groups of the prepolymer.

Where PVC for example is used as the thixotropicizing agent, the plasticizer may be selected from the class of phthalic acid esters. Examples of suitable compounds from this class are dioctyl phthalate, dibutyl phthalate and benzyl butyl phthalate. Other classes of compounds which show the requisite properties are chloroparaffins, alkyl sulfonic acid esters of phenol and cresol and also fatty acid esters. Plasticizers based on an alkyl sulfonic acid ester and polyvinyl chloride as swellable polymer powder are particularly preferred for the process according to the invention.

Suitable swelling aids are low molecular weight organic substances which are miscible with the polymer powder and the plasticizer and which do not react with the isocyanate groups of the polyurethane prepolymer. Where a polymer powder in which covalent crosslinks are present between the "coils" is used, basically any solvent which satisfies the above-mentioned requirements and in which the uncrosslinked polymer is soluble may be used as swelling aids.

If the polymers used are not covalently crosslinked, it is only possible to use as swelling aids those solvents with which a solvation equilibrium, in which not all the secondary valency bonds between the individual coils of the polymers are removed by solvation, is established. This only applies to solvents in which the polymers are only slightly soluble. In this case, therefore, the expert will select as swelling aids those solvents in which the polymer is only poorly to moderately soluble. Extensive data are available to the expert in the known literature (Polymer Handbook, Kunststoff-Handbuch, etc.) for making this choice.

Preferred swelling aids for polyvinyl chloride powder are esters, ketones, aliphatic hydrocarbons, aromatic hydrocarbons and also aromatic hydrocarbons containing alkyl substituents. Particularly preferred swelling aids for polyvinyl chloride powder are aromatic hydrocarbons containing alkyl substituents, particularly xylene.

The mixture of polyurethane prepolymer, polymer powder, plasticizer and swelling aid used as thixotropicizing agent in the joint sealing compound according to the invention has to be specifically formulated in dependence upon the requirements which the joint sealing compound has to satisfy in each particular case.

In the context of the teaching according to the invention, preferred joint sealing compounds comprise 25 to 35% by weight polyurethane prepolymer,
25 to 35% by weight swellable polymer powders,
20 to 30% by weight plasticizers (swelling agents),
3 to 7% by weight swelling aids,
4 to 9% by weight pigments and dyes,
0.01 to 2% by weight catalysts and other auxiliaries,
1 to 5% by weight stabilizers.

Both polyurethane prepolymers and also joint sealing compositions consisting of polyurethane prepolymers and a system of swellable polymer powder, plasticizer and swelling aid often show only unsatisfactory stability in storage. For this reason, therefore, substances which perform the function of a stabilizer against oxidation, heat, light and hydrolysis are often added to them. Known stabilizers are benzoyl chloride, acetyl chloride, toluenesulfonic acid methyl ester, carbodiimides and polycarbodiimides.

It has now been found that $C_8$–$C_{20}$ olefins are very good stabilizers for joint sealing composition which, in addition to their stabilizing effect, can also perform functions of plasticizers and swelling agents. They may be used in higher concentrations and as partial replacements for the plasticizers and swelling aids. The olefins reduce the viscosity of the joint sealing compound, guaranteeing the ready sprayability required. In contrast to aromatic hydrocarbons, the olefins are less volatile, have a higher flash point and are preferred as a partial replacement for the usual swelling agents by virtue of their lower toxicity and carcinogenicity.

The olefins useful in the practice of the present invention are compounds from the group consisting of octene, nonene, decene, undecene, dodecene, tridecene, tetradecene, pentadecene, hexadecene, heptadecene, octadecene, nonadecene and eicosene and may be used as stabilizers according to the invention. Other suitable stabilizers for mixtures of the invention are the analogous, branched $C_8$–$C_{20}$ olefins and also the analogous, polyolefinically unsaturated compounds. Preferred stabilizers are $C_8$–$C_{16}$ olefins. More preferred stabilizers are olefins in which the double bond is in the 1,2-position and also olefins which do not have any molecular branching. Particularly preferred stabilizers are 1-octene, 1-decene, 1-dodecene and 1-hexadecene; within this group, 1-dodecene is particularly preferred.

Suitable pigments and dyes for the joint sealing composition according to the invention are the substances typically used for joint sealing compounds, such as titanium dioxide, iron oxide and carbon black. The joint sealing compounds also contain catalysts, such as dibutyl tin dilaurate, diacetate, diversatate and tin(II) octoate to accelerate the reaction.

In the context of the teaching according to the invention, other auxiliaries are understood to be hardeners, siccatives, stabilizers, primers and the like.

The present invention provides a joint sealing composition which shows distinctly improved stability in storage in relation to the prior art through the addition of olefins as stabilizers.

The invention is illustrated by the following Examples.

EXAMPLES

Example 1

Preparation of the polyurethane prepolymer

In a heated mixing vessel, 267 g of a glycerol-PO adduct having a molecular weight of approximately 4000, 800 g of a polypropylene glycol having a molecular weight of approximately 2000 and 207.5 g diphenyl methane diisocyanate were heated with vigorous stirring under nitrogen for 5.5 hours at a temperature of 80° C. On completion of the reaction, an NCO content of 2.2% was determined in the prepolymer, based on the total weight of the prepolymer.

Various joint sealing compositions having the following composition were prepared on the basis of these prepolymers:

1280 parts polyurethane prepolymer 1160 parts swellable polymer powder (finely divided polyvinyl) chloride powder having a K value of approximately 70)
960 parts plasticizer (pentadecanesulfonic acid alkyl phenol ester - Mesamoll®, a product of Bayer AG)
157 parts swelling aid (xylene, anhydrous),
280 parts pigment (dry titanium dioxide rutile pigment produced by the chloride process)
1 part catalyst (dibutyl tin dilaurate)
120 parts stabilizer.

The following substances were used as stabilizers:
Example 1: 1-octene
Example 2: 1-decene
Example 3: 1-dodecene
Example 4: 1-tetradecene
Example 5: 1-hexadecene
Comparison Example A:
Comparison Example B: propylbenzene
Comparison Example C: dodecane The extrusion rates measured in accordance with DIN 52 456 are shown in Table 1.

TABLE 1

| Examples | Extrusion Rates (g/min.) | | | | | | | |
|---|---|---|---|---|---|---|---|---|
| | 1 | 2 | 3 | 4 | 5 | A | B | C |
| Storage at 23° C. | | | | | | | | |
| After 1 week | 264 | 288 | 252 | 292 | 324 | 79 | 170 | 207 |
| After 4 weeks | 231 | 231 | 225 | 193 | 256 | 40 | 142 | 156 |
| After 32 weeks | 129 | 118 | 137 | 98 | 123 | 0 | 76 | 0 |
| Storage at 50° C. | | | | | | | | |
| After 1 week | 124 | 153 | 150 | 149 | 191 | 16 | 65 | 107 |
| After 6 weeks | 90 | 73 | 93 | 46 | 91 | 0 | 0 | 0 |

The extrusion rates demonstrate the advantage of the joint sealing compositions containing olefinic stabilizers over the comparison samples.

We claim

1. Moisture-hardening join sealing composition which comprises:
   20 to 40% by weight polyurethane prepolymer,
   20 to 40% by weight swellable polymer powder,
   15 to 35% by weight plasticizer,
   1 to 10% by weight swelling aid,
   1 to 10% by weight pigments and dyes,
   0.01 to 10% by weight of at least one composition selected from the group consisting of catalysts, hardeners, siccatives, and primers,
   1 to 10% by weight stabilizer, wherein the stabilizer comprises at least one $C_8$–$C_{20}$ olefin.

2. A joint sealing composition of claim 1 wherein the composition comprises:
   25 to 35% by weight polyurethane prepolymer
   25 to 35% by weight swellable polymer powders,
   20 to 30% by weight plasticizers,
   3 to 7% by weight swelling aids,
   4 to 9% by weight pigments and dyes,
   0.01 to 2% by weight of at least one composition selected from the group consisting of catalysts, hardeners, siccatives and primers,
   1 to 5% by weight $C_8$–$C_{20}$ olefins.

3. A joint sealing composition of claim 1 wherein the olefin present has at least one of the following properties: chain length 8–16 C atoms, a double bond in the 1,2-position and no branching of the molecule.

4. A joint sealing composition of claim 1 wherein a reaction product of a polyether polyol with an excess of an aromatic diisocyanate comprises the polyurethane prepolymer.

5. A joint sealing composition of claim 1 containing as the swellable polymer powder, polymers without any functional groups capable of reacting with isocyanates.

6. A joint sealing composition of claim 1 wherein the swellable polymer powder is PVC and the plasticizer is a plasticizer for PVC.

7. A joint sealing composition of claim 1 wherein the swelling aid comprises at least one organic solvent selected from the group consisting of: esters, ketones, aliphatic hydrocarbons and aromatic hydrocarbons.

8. A joint sealing composition of claim 5 wherein the swellable polymer comprises at least one polymer selected from the group consisting of polyurethanes, polyacrylates, polymethacrylates and polyvinyl chloride.

9. A joint sealing composition of claim 6 wherein the plasticizer comprises at least one composition selected from the group consisting of plasticizing esters and chloroparafins.

10. A composition of claim 9 wherein the plasticizer comprises an alkyl sulfonic acid ester.

* * * * *